United States Patent
Koudas et al.

(10) Patent No.: US 7,668,801 B1
(45) Date of Patent: Feb. 23, 2010

(54) METHOD AND APPARATUS FOR OPTIMIZING QUERIES UNDER PARAMETRIC AGGREGATION CONSTRAINTS

(75) Inventors: Nikolaos Koudas, Springfield, NJ (US); Divesh Srivastava, Summit, NJ (US); Sudipto Guha, Philadelphia, PA (US); Dimitrios Gunopulos, Irvine, CA (US); Michail Vlachos, Elmsford, NY (US)

(73) Assignee: AT&T Corp., New York, NY (US)

(*) Notice: Subject to any disclaimer, the term of this patent is extended or adjusted under 35 U.S.C. 154(b) by 525 days.

(21) Appl. No.: 10/828,839

(22) Filed: Apr. 21, 2004

Related U.S. Application Data

(60) Provisional application No. 60/464,256, filed on Apr. 21, 2003.

(51) Int. Cl.
*G06F 17/30* (2006.01)
*G06F 7/00* (2006.01)
(52) U.S. Cl. .................... 707/2; 707/3; 707/100
(58) Field of Classification Search .............. 707/2–6, 707/100–102
See application file for complete search history.

(56) References Cited

U.S. PATENT DOCUMENTS

| | | | |
|---|---|---|---|
| 5,485,550 A | 1/1996 | Dalton | |
| 5,619,709 A | 4/1997 | Caid et al. | |
| 5,974,412 A | 10/1999 | Hazlehurst et al. | |
| 6,088,524 A * | 7/2000 | Levy et al. | 707/3 |
| 6,122,628 A * | 9/2000 | Castelli et al. | 707/5 |
| 6,169,983 B1 | 1/2001 | Chaudhuri et al. | |
| 6,289,353 B1 | 9/2001 | Hazlehurst et al. | |
| 6,516,310 B2 | 2/2003 | Paulley | |
| 6,807,546 B2 | 10/2004 | Young-Lai | |
| 7,295,956 B1 * | 11/2007 | Ruetsch | 703/2 |
| 2002/0156667 A1 * | 10/2002 | Bergstrom | 705/7 |
| 2002/0178158 A1 * | 11/2002 | Kanno | 707/5 |
| 2003/0187703 A1 * | 10/2003 | Bonissone et al. | 705/4 |
| 2003/0204499 A1 * | 10/2003 | Shahabi et al. | 707/3 |
| 2004/0003004 A1 * | 1/2004 | Chaudhuri et al. | 707/200 |
| 2004/0030677 A1 | 2/2004 | Young-Lai | |
| 2004/0111408 A1 * | 6/2004 | Caudill et al. | 707/3 |
| 2005/0015216 A1 * | 1/2005 | V. Kothuri | 702/158 |

* cited by examiner

*Primary Examiner*—Luke S. Wassum
*Assistant Examiner*—Susan F Rayyan

(57) ABSTRACT

The present invention relates to a method and apparatus for optimizing queries. The present invention discloses an efficient method for providing answers to queries under parametric aggregation constraints.

5 Claims, 6 Drawing Sheets

Algorithm GeneratePartitions($\epsilon, \epsilon', D$)

Initialize:
   $Q$: Queue of multidimensional constraint vectors
   $\mathcal{R}$: R-tree
   $s, c, c'$ : constraint vectors
      each coordinate of $s$ is initially set to be
      equal to $D$ and, and $s$ is added to $Q$ (1)   while $Q$ not empty
(2)     $\bar{c}$ = headof($Q$)
(3)     $(r, \bar{C}, p, S)$ = LocateSolution($\bar{c}$)
(4)     if there is no rectangle $r'$ in the R-tree $\mathcal{R}$
        that contains rectangle $r$ and $r$ not NULL
(5)        Insert $(r, p, \bar{C}, S)$ to the R-tree $\mathcal{R}$
        by storing $(r, p, \bar{C})$ in a leaf index entry
        and maintaining a pointer to the set of
        tuple identifiers in the solution $S$ on disk
(6)        CreateFront($Q, r$)
(7)     endif
(8)   end-while Algorithm LocateSolution($\bar{c}$)

Input: constant vector $\bar{c} = (c_1, \ldots c_n)$
Output: $(r, \bar{C}, p.S)$
(1)   $(p, S)$ = MultiKnapsack($\bar{c}$)
(2)   if ($S$ is NULL) return (NULL, NULL, 0, NULL)
(3)   for $i = 1$ to $n$
(4)     $c'_i = \frac{c_i}{1+\epsilon}$
(5)   $(p', S')$ = MultiKnapsack($\bar{c}'$)
(6)   if ($S'$ is NULL) return (NULL, NULL, 0, NULL)
(7)   if ( $(1 + \epsilon')p' > p$ )
(8)     while ($p' \geq \frac{p}{1+\epsilon'}$)
(9)       $\bar{c}_t = \bar{c}'; p_t = p'; S_t = S'$
(10)      for $i = 1$ to $n$
(11)        $c'_i = \frac{c'_i}{1+\epsilon'}$
(12)      $(p', S')$ = MultiKnapsack($\bar{c}'$)
(13)     end-while
(14)     return (FormRect($\bar{c}_t, \bar{c}$), $\bar{c}_t, p_t, S_t$)
(15)   else
(16)     return (FormRect($\bar{c}', \bar{c}$), $\bar{c}, p, S$)

FIG. 4

METHOD AND APPARATUS FOR OPTIMIZING QUERIES UNDER PARAMETRIC AGGREGATION CONSTRAINTS

CROSS-REFERENCE TO RELATED APPLICATIONS

This application claims benefit of U.S. provisional patent application Ser. No. 60/464,256, filed Apr. 21, 2003, which is herein incorporated by reference.

BACKGROUND OF THE INVENTION

1. Field of the Invention

Embodiments of the present invention generally relate to a method for optimizing queries. More specifically, the present invention discloses an efficient method for providing answers to queries under parametric aggregation constraints.

2. Description of the Related Art

In today's rapidly changing business landscape, corporations increasingly rely on databases to help organize, manage and monitor every aspect of their business. Databases are deployed at the core of important business operations, including Customer Relationship Management, Supply Chain Management, and Decision Support Systems. The increasing complexity of the ways in which businesses use databases creates an ongoing demand for sophisticated query capabilities.

Novel types of queries seek to enhance the way information is utilized, while ensuring that they can be easily realized in a relational database environment without the need for significant modifications to the underlying relational engine. However, as the size of databases continues to grow, coupled with the desire by users to formulate complex queries, traditional methods of responding to queries require a tremendous amount of computational cycles. This leads to delay and inefficiencies in the use of databases.

Therefore, there is a need for a method to efficiently provide answers to complex queries.

SUMMARY OF THE INVENTION

In one embodiment, the present invention generally relates to a method and apparatus for optimizing queries. The present invention discloses an efficient method for providing answers to queries under parametric aggregation constraints.

More specifically, the present invention discloses a method that preprocesses relations and constructs indices to efficiently provide answers to queries, e.g., optimization under parametric aggregation (OPAC) queries. The answers returned by the indices are approximate, not exact, (e.g., within an approximation factor) and provide guarantees for their accuracy. Moreover, the indices can be tuned easily to meet desired accuracy levels, providing a graceful tradeoff between answer accuracy and index space.

For example, a user may submit a query having aggregation constraints, where the user is willing to accept answers within a selectively defined approximation factor. In doing so, the results can be generated quickly without having to solve a multi-attribute knapsack problem from scratch for every query having aggregation constraints.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4 illustrates the preprocessing method of the present invention in pseudo code format;

To facilitate understanding, identical reference numerals have been used, wherever possible, to designate identical elements that are common to the figures.

DETAILED DESCRIPTION OF THE PREFERRED EMBODIMENT

Figure 1:
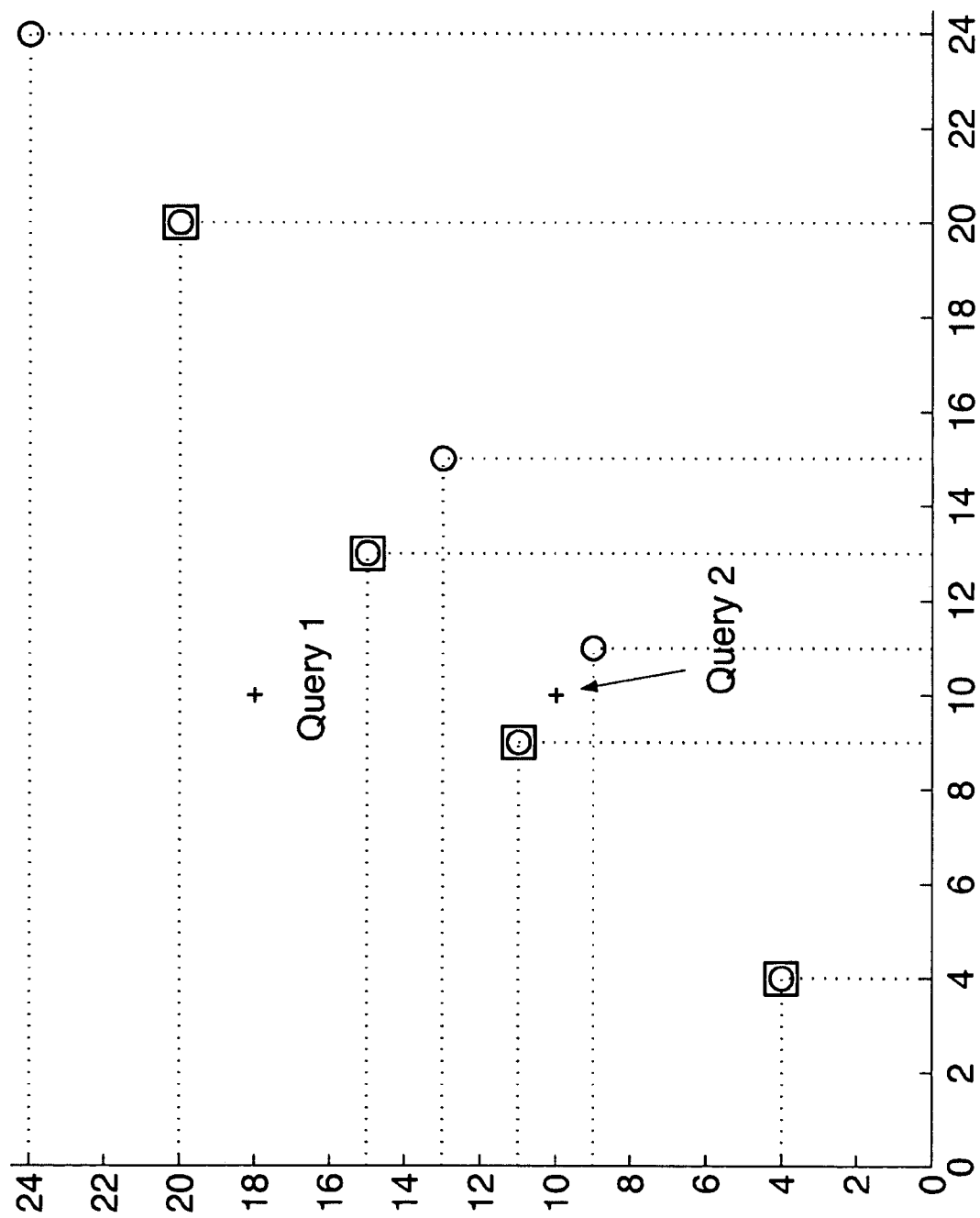
FIG. 1 illustrates an example of an $\epsilon$-Pareto set.

In one embodiment, the present invention addresses a class of queries that is referred to as OPAC (optimization under parametric aggregation constraints) queries. Such queries aim to identify sets of database tuples that constitute solutions of a large class of optimization problems involving the database tuples. To illustrate this important class of queries, consider the following simple example.

Consider a large distributor of cables, who maintains a database relation R keeping track of the products in stock. Cable manufacturers ship their products in units, each having a specific weight and length. Assume that relation R has attributes uid (a unit identifier), manufacturer, weight, length and price, associated with each cable unit. A sample relation R is depicted in Table 1.

TABLE 1

| Uid | Manufacturer | Weight | Length | Price |
| --- | --- | --- | --- | --- |
| 1 | Optical Co. | 30 | 40 | 50 |
| 2 | Optical Co. | 20 | 50 | 50 |
| 3 | Optics Inc. | 30 | 70 | 80 |
| 4 | Opticom Co. | 20 | 20 | 10 |
| 5 | Optics Inc. | 20 | 20 | 20 |

Commonly, "queries" select cable units by imposing constraints on the total length and total weight of the units they are interested in, while optimizing on total price. Thus, the desired result is a set of tuples collectively meeting the imposed aggregate constraints and satisfying the objective function. Note that this is considerably different from selecting cable units (tuples) based on their individual attribute values.

For example, one query could request the set of cable units having the smallest total price, with total length no less than $L_c=90$ and total weight no less than $W_c=50$. A straight-forward solution to this query involves computing the total weight and length of each possible subset of cable units in R, identifying those that respect the constraints on length and weight, and returning the one with the lowest price. Clearly, such a brute force evaluation strategy is not desirable. In the example of Table 1, the answer set for this query would be {$uid_2$, $uid_4$, $uid_5$}, with a total price of 80.

A different query could seek to maximize the total price for a number of cable units requested, of total length no more than $L_c$=90 and of total weight no more than $W_c$=50. In this case, the answer set for this query would be {$uid_1$, $uid_2$} or {$uid_3$, $uid_5$} each with a total price of 100.

Finally, observe that $L_c$ and $W_c$ are parameters of these two OPAC queries, and different users may be interested in these queries, but with different values specified for each of these parameters.

Instances of OPAC queries are ubiquitous in a variety scenarios, including simple supplier-buyer scenarios (as illustrated by the present example), that use relational data stores. These queries can be easily generalized to more complex scenarios involving Business to Business interactions in an electronic marketplace. Any interaction with a database, requesting a set of tuples as an answer, specifying constraints over aggregates of attributes values, seeking to optimize aggregate functions on some measure attribute in the result set, is an instance of an OPAC query.

OPAC queries have a very natural mathematical interpretation. In particular, these queries represent instances of optimization problems with multiple constraints, involving the tuples and attributes of a database relation. Before describing the invention in greater detail, a series of mathematical definitions are presented below.

Let $R(A_1, \ldots A_5, P)$ be a relation, with attributes $A_1, \ldots, A_n$, P. Without loss of generality assume that all attributes have the same domain. Denote by S a subset of the tuples of R and by $S_{Ai}$, $1 \leq i \leq n$ and $S_p$, the (multiset of) values of attribute $A_i$, $1 \leq i \leq n$ and P in S, respectively. Let $f_i$, $1 \leq i \leq n$ and F denote aggregate functions (e.g., sum, max). The present invention considers atomic aggregation constraints of the form $f_i(S_{Ai}) \theta c_i$, where $\theta$ is an arithmetic comparison operator (e.g., $\leq$, $\geq$), and $c_i$ is a constant, and complex aggregation constraints that are boolean combinations of atomic aggregation constraints. The present invention refers to them collectively as aggregation constraints, denoted by $\psi$.

Definition 1: (General OPAC Query Problem): Given a relation $R(A_1, \ldots, A_n, P)$, a general OPAC query Q specifies (i) a parametric aggregation constraint $\Psi_{\bar{v}}$, (ii) an aggregate function F, with optimization objective m (min or max), and (iii) a vector of constants $\bar{c}$. It returns a subset S of tuples from R as its result, such that (i) $\Psi_{\bar{v}=\bar{c}}(S_{Ai}, \ldots, S_{An})$=TRUE, and (ii) ($\forall S' \subseteq R$, $\Psi_{\bar{v}=\bar{c}}(S'_{Ai}, \ldots, S'_{An})$=TRUE$\Rightarrow$(F(S'$_P$)$\leq_m$F(S$_P$)).

Intuitively, the result of a general OPAC query Q is a subset S of tuples of R that satisfy the parametric aggregation constraint $\Psi_{\bar{v}}$(with the parameters $\bar{v}$ instantiated to the vector of constants $\bar{c}$), such that its aggregate objective function is optimal (i.e., maximal under $\leq$m) among all subsets of R that satisfy the (instantiated) parametric aggregation constraint.

It is evident that the result of a general OPAC query involves the solution of an optimization problem involving a (potentially) complex aggregation constraint on relation R. Depending on the specifics of the aggregate functions $f_i$, F, the nature of the aggregation constraint, and the optimization objective, different instances of the OPAC query problem arise.

The present invention considers the instance of the problem when the aggregate functions $f_i$, F return the sum of the values in their input multisets, the aggregation constraints are conjunctions of atomic aggregation constraints of the form $f_i(S_{Ai}) \leq c_i$, and the objective function seeks to maximize $F(S_P)$.

This formulation of an OPAC query gives rise to an optimization problem, namely the "multi-attribute knapsack" problem. Given this relationship between the specific form of the OPAC query and the multi-attribute knapsack problem, the present invention will refer to values of the function $F(S_P)$ as the "profit" for the set of tuples S. It is known that solving the knapsack problem, even in the simple instance involving a constraint on only one attribute (e.g., $\Sigma_{x_i \in S_{Ai}} x_i \leq c_i$ and maximize $\Sigma_{x_j \in S_P} x_j$) is NP-complete. However, this problem is solvable in pseudo-polynomial time with dynamic programming. For example, the pseudo-polynomial algorithm solving the knapsack problem in the single attribute case can serve as a basis for a solution of the multi-attribute problem as well. In particular, one could generate all solutions for one attribute, and pick the solution S that maximizes $F(S_P)$ among all solutions that satisfy the constraints on all attributes. The form of the solution that is reported could vary; for example, the solution could be the set of tuple identifiers from R.

It is evident that every OPAC query Q determines an instance of a multi-attribute knapsack problem on relation R. Since the relation R can be very large, in the general case, solving the multi-attribute knapsack problem from scratch every time an OPAC query is posed is not at all pragmatic. Such an approach would be far from being interactive and, more importantly, it would be entirely DBMS agnostic, missing the opportunity to utilize the underlying DBMS infrastructure for query answering.

In the present invention, the Pareto (or, dominating) set is the set of optimal solutions that are mutually incomparable, because improving one objective would lead to a decrease in another. In the present setting, the present invention considers a single optimization objective, but the present invention allows the user to dynamically specify the aggregation constraint parameters. Thus, the present invention can adapt the Pareto framework to the OPAC query problem.

Definition 2 (Pareto Set): The Pareto set P for an OPAC query defined on a relation R is the set of pairs {($\bar{c}$, S)} of all n-dimensional vectors $\bar{c} = (c_i, \ldots, c_n)$ and associated solutions S, such that (a) there exists a solution $S \subseteq R$ with $f_i(S_{Ai})=c_i$, $1 \leq i \leq n$, and (b) there is no other pair ($\bar{c}'$, S'), such that $f_i(S'_{Ai})=c'_i$, $c'_i \leq c_i$, $1 \leq i \leq n$ and $F(S'_P) > F(S_P)$.

This approach produces useful solutions where they are optimal both in terms of the parameters realizing them and the profit obtained. For any element ($\bar{c}$,S) of the Pareto set, there is no other solution with higher profit achieved by parameters at most as large in all dimensions as $\bar{c}$. Identifying such a set would be very informative as it contains valuable information about maximal profits.

The concept of Pareto points will be illustrated in an example with reference to Table 2 and FIG. 1. Specifically, given the relation S in Table 2, the Pareto points are the round points in FIG. 1.

TABLE 2

| Relation S | a1 | a2 | Profit |
| --- | --- | --- | --- |
| t1 | 9 | 11 | 100 |
| t2 | 11 | 9 | 100 |
| t3 | 4 | 4 | 20 |

For example, (24, 24) is a Pareto point with profit 220, realized by the entire set of tuples. The vector (13, 15) with profit 120 is also a Pareto point, the corresponding set of tuples being {$t_1, t_3$}, because no vector ($c_1, c_2$) with $c_1 \leq 13$ and $c_2 \leq 15$ has profit more than 120.

The notion of Pareto sets are defined for arbitrary classes of constraint problems and functions, not only for the multi-attribute knapsack. The constraint problems can be discrete and, in most such cases, the Pareto set can have exponentially many elements. This happens because linear programs can be posed in the Pareto framework, and the convex hull of the solution space for linear programs can have exponentially many (in the number of objects/variables) vertices.

The size of the Pareto set for an instance of the multi-attribute knapsack problem can be exponential in the number of tuples, even if the number of attributes is a small constant. Consider, for example, the case where there is only one attribute, $A_1$ and a profit attribute P, and tuple i in relation R has the form ($2^i$, $2^i$). In this case, any subset of the tuples in R defines a unique cost and profit vector and no other set can achieve at least as small a cost and a higher profit. Therefore, all the subsets of tuples define dominating points.

To circumvent this problem, one can approximate the Pareto set. The $\epsilon$-Pareto set, is a set of "almost" optimal solutions defined as: for every optimal solution c, the $\epsilon$-Pareto set contains a solution that optimizes each of the optimization criteria within a fraction of $\epsilon$ (e.g., an approximation factor or an accuracy factor). It has been shown that the $\epsilon$-Pareto set for a multi-objective knapsack problem can be computed efficiently and it is polynomial in size.

Given a relation R, functions $f_i$ and F, and $\epsilon > 0$, the $\epsilon$-Pareto set, $P_\epsilon$ is a set of solutions that almost dominate any other solution.

Definition 3 ($\epsilon$-Pareto set): The $\epsilon$-Pareto set for an OPAC query is a set of pairs $\{(\bar{c}, S)\}$ of n-dimensional vectors $\bar{c} = (c_1, \ldots c_n)$ and solutions S, such that, (a) there exists a solution $S \subseteq R$ with $f_i(S_{Ai}) \leq c_i$, $1 \leq i \leq n$, and (b) there is no other pair $(\bar{c}', S')$, such that $f_i(S'_{Ai})$, $\leq c_i'$, $1 \leq i \leq n$, $c_i' \leq (1+\epsilon) c_i$, $1 \leq i \leq n$ and $F(S'_P) > (1+\epsilon) F(S_P)$.

The $\epsilon$-Pareto set is illustrated as an example in FIG. 1. If $\epsilon$ is 0.25, the set of the rectangular points in FIG. 1 is an $\epsilon$-Pareto set. For example, point (13, 15) is in the $\epsilon$-Pareto set because there is no vector with coordinates less than 1.25* (13, 15) that has profit more than 120* 1.25.

The $\epsilon$-Pareto set is a very useful measure. Assuming that the size of this set is manageable, one could quickly generate an $\epsilon$-Pareto set and utilize it for query answering. For example, one can show the following theorem:

Theorem 1: The size of the $\epsilon$-Pareto set for an OPAC query instance defined on a relation R is polynomial in |R| (the size of R) and $1/\epsilon$, but may be exponential in the number of attributes.

Proof: Assume that the n attributes of R are integers. Since $f_i$ and F are polynomial functions (and more specifically sums), the domain of each of these functions cannot be more that $a^{|R|}$ for some constant a>1. One can cover the space of [1, $a^{|R|}$] with a set of geometrically increasing intervals with step $1+\epsilon$.

To cover each domain one need $$O\left(p\left(\frac{|R|}{\varepsilon}\right)\right)$$

intervals (for some polynomial p).

Taking the Cartesian product one can get a total of $$O\left(p\left(\frac{|R|}{\varepsilon}\right)^n\right)$$

hyper-rectangles. Clearly, taking one solution from the interior of each hyper-rectangle (if such a solution exists) results in an $\epsilon$-Pareto set.

The present invention will provide the description of a technique suitable for efficiently answering OPAC queries over a database. In brief, the present method will provide an approximate solution but it will provide guarantees for an acceptable level of accuracy, which will expose useful tradeoffs that will be discussed below.

Figure 2:
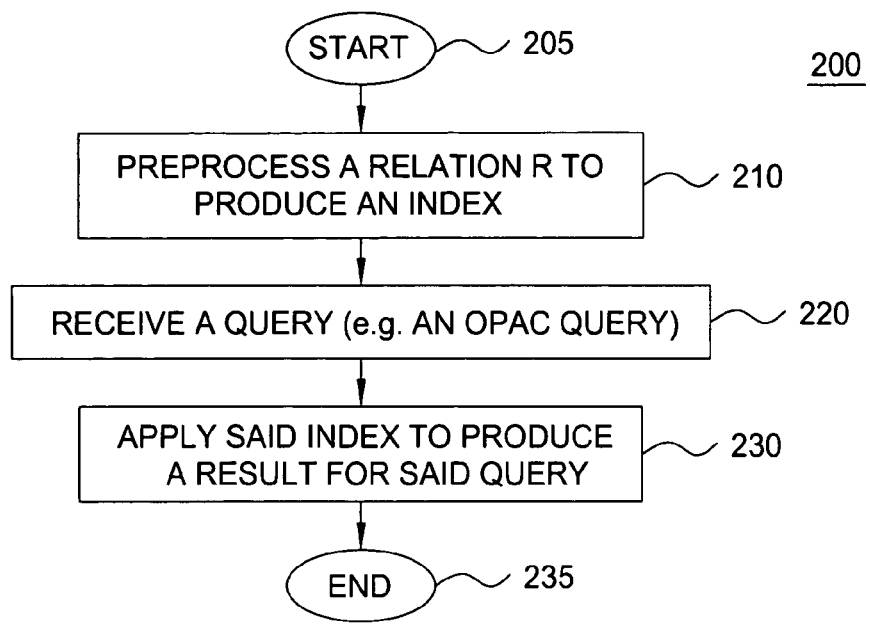
FIG. 2 illustrates a method of the present invention for efficiently providing a result to a query having aggregation constraints, e.g., an OPAC query.

FIG. 2 illustrates a method 200 of the present invention for efficiently providing a result to a query having aggregation constraints, e.g., an OPAC query. The method starts in step 205 and proceeds to step 210 where a preprocessing step is performed. Specifically, given a relation R (e.g., a database having a plurality of attributes or fields), the relation R is preprocessed to construct an index. In one embodiment, this step involves evaluating solutions to a multi-attribute knapsack problem on R, for only a select number of vectors of constants. A detailed description in the construction of the index is further provided below.

In step 220, a query having aggregation constraints is received by method 200. For example, the query can be an OPAC query.

In step 230, method 200 applies the index in response to the query having aggregation constraints to quickly provides an exact answer or an answer that is "guaranteed accurate" as suitably defined below. Method 200 ends in step 235.

In one embodiment, the present method is to preprocess relation R, constructing index structures enabling efficient answers to arbitrary OPAC queries. For a query Q, the present invention is intended to provide either the exact answer, or an answer that is "guaranteed accurate", for suitably defined notions of accuracy. Moreover, the present construction will expose a tradeoff between accuracy and space, thereby providing the flexibility to fine tune the accuracy of the answers. The present invention quantifies the accuracy of answers to an OPAC query below Definition 4 ($\epsilon$, $\epsilon'$-Accurate Answers): Let Q be an OPAC query specifying a vector of constants $\bar{c} = (c_1, \ldots, c_n)$, having an answer S with profit P. For any $\epsilon$, $\epsilon' > 0$, an $\epsilon$, $\epsilon'$-Accurate answer to Q, is a vector $\bar{c}' = (c'_1, \ldots, c'_n)$ and an answer set S', such that $\forall_i$, $1 \leq i \leq n$, $\bar{c}' \leq (1+\epsilon)c_i$ and P' $(1+\epsilon') > P$, where P' is the profit of an OPAC query specifying vector $\bar{c}'$ of constants.

Assume that Q is a query specifying a vector $\bar{c}$ of constants and that the answer to Q is a set $S \subseteq R$ with maximum profit P. An $\epsilon$, $\epsilon'$-accurate answer to Q is an answer set S' that is either the exact answer set S or it is an answer set corresponding to a query Q'. Query Q' specifies a vector of constants having values in each dimension less than or equal to $1+\epsilon$ of the corresponding values specified by Q. Moreover, the profit of Q' is strictly higher than a fraction of $1+\epsilon'$ of P. In the definition, without loss of generality, the present invention assumes the same $\epsilon$ fraction is used for all constant values. Different values for $\epsilon$ can be used for each of the values, if this is desirable, $\epsilon$ being defined as a vector in this case. In fact, the present invention does specify a different approximation factor, $\epsilon'$, for the profit, to differentiate between the aggregate functions f and F.

As discussed in FIG. 2, the present invention preprocesses relation R, by constructing an index providing $\epsilon$, $\epsilon'$-accurate answers to OPAC queries. In one embodiment, the preprocessing will consist of solving the multi-attribute knapsack problem exactly, for a select subset of the candidate query space of all possible OPAC queries. The present invention will then utilize these solutions towards providing $\epsilon$, $\epsilon'$-accurate answers to any candidate OPAC query on R.

This gives rise to the main problem addressed by the present invention. Given a relation R, an OPAC query without the vector of constants $\vartheta$ and $\epsilon$, $\epsilon'$, preprocess R constructing an index being able to efficiently provide $\epsilon$, $\epsilon'$-accurate answers to any OPAC query on R that provides the parameters (values) to the constant vector $\vartheta$.

Consider the example of FIG. 1 again. Assume $\epsilon=\epsilon'=0.25$. Assume that the query (10, 18) is given, that is, find a set of objects that satisfy these conditions and maximize the Profit. The set $\{t_1\}$ is an $\epsilon$, $\epsilon'$-accurate answer because it satisfies the constraints, and there is no other set that has higher profit even if the present invention relaxes the constraints by $\epsilon$.

If the query was (10, 10), the set $\{t_1\}$ is again an $\epsilon$, $\epsilon'$-accurate answer. Although the set does not satisfy the query constraints, it satisfies the relaxed constraints ((9, 11)≦1.25*(10, 10)), and has the highest profit among all solutions that satisfy these constraints.

Figure 3:
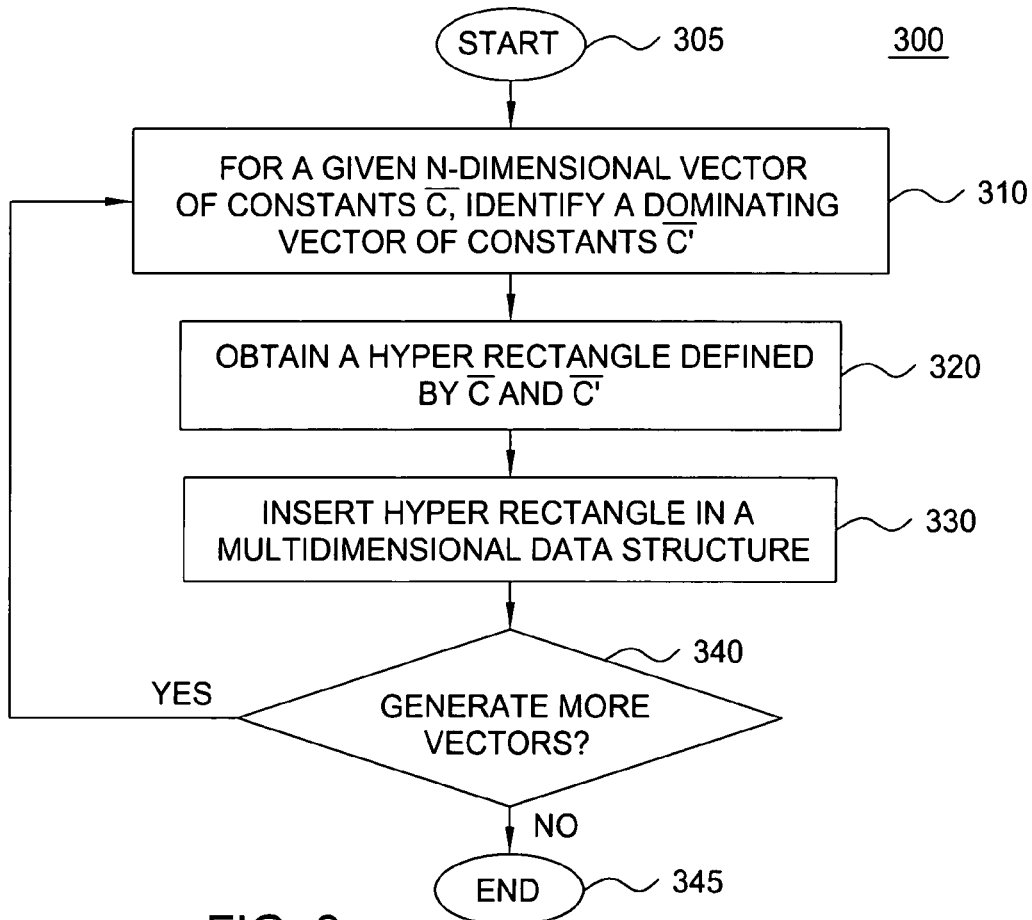
FIG. 3 illustrates a method for preprocessing a relation R.

FIG. 3 illustrates a method 300 for preprocessing a relation R. Specifically, for a relation $R(A_1, \ldots A_n, P)$, assume that the range of the $\Sigma$ function applied on elements of each attribute $A_i$ has range $[O \ldots D]$. Any candidate query Q specifies an n-dimensional vector of constants $\bar{c} \in [0 \ldots D]^n$. The present invention will preprocess the space $[0 \ldots D]^n$ of all vectors of constants that can be specified by a possible query, creating a number of partitions that aim to cover the space of all possible queries. The partitions will be constructed in a way such that, for all possible queries inside a partition, one can reason collectively about the properties and values of function F. Moreover, it will allow the present invention to derive an $\epsilon$, $\epsilon'$-accurate answer for any query falling inside a partition.

Method 300 starts in step 305 and proceeds to step 310. In step 310, given a n-dimensional vector of constants $\bar{c}$, method 300 identifies a dominating vector of constants $\bar{c}'$. Specifically, the property between n-dimensional vectors of constants are defined below.

Let $\bar{c}=(c_1, \ldots, c_n)$, $\bar{c}'=(c'_1, \ldots, c'_n)$ be two n-dimensional vectors of constants. It is defined that $\bar{c}$ is dominated by $\bar{c}'$, ($\bar{c} \ll \bar{c}'$) if $c_i \leq c'_i$, $1 \leq i \leq n$.

The following observation is then made. Let Q, Q' be two queries on R, specifying vectors of constants $\bar{c}$, $\bar{c}'$, having result sets S, S' respectively. If $\bar{c} \ll \bar{c}'$ then $F(S_P) = \Sigma_{x_j \in S_P} \leq F(S'_P) = \Sigma_{x_j \in S'_P} x_j$.

Thus, if a vector of constants $\bar{c}$ is dominated by a vector $\bar{c}'$, the profit one can achieve for $\bar{c}$ is less than or equal to the profit one can achieve using the vector $\bar{c}'$. A consequence of the above observation is the following: Consider a sequence of queries, with vectors of constants, $\bar{c}_1 \ll \bar{c}_2 \ldots \ll \bar{c}_m$. Observing the evolution of the values of F in each answer obtained starting from $\bar{c}_m$, moving towards $\bar{c}_i$, function F is monotonically non-increasing. The present technique will trace the evolution of function F along such sequences of dominated vectors. In order to be able to provide $\epsilon$, $\epsilon'$-accurate answers, one has to identify vectors of constants that cause the value of function F to change by an $\epsilon'$ fraction. At the same time, the coordinates of such vectors have to be related by $\epsilon$ as required by $\epsilon$, $\epsilon'$-accurate answers.

Let $[0 \ldots D]^n$ be the domain of all possible vectors of constants and consider one of these vectors, $\bar{c} \in [0 \ldots D]^n$. Let $S_{\bar{c}}$ be the solution to the query with vector of constants $\bar{c}$ and $F(S_{\bar{c}})$ be the associated profit. The present invention will aim to identify the vector of constants $\bar{c}'$ by manipulating the coordinates of vector $\bar{c}$ by fractions of $1+\epsilon$, such that (a) $\bar{c}' \ll \bar{c}$, (b) $(1+\epsilon') F(S_{\bar{c}'}) > F(S_{\bar{c}})$, where $S_{\bar{c}'}$ the solution to the OPAC query with vector of constants $\bar{c}'$ and (c) vector $\bar{c}'$ is minimal.

Returning to FIG. 3, method 300 in step 320 obtains a hyper rectangle or partition defined by vectors $\bar{c}$ and $\bar{c}'$. By definition, any query with vector of constants inside the hyper rectangle has $\bar{c}'$ as an $\epsilon$, $\epsilon'$-answer.

In step 330, method 300 then inserts the hyper rectangle into a multidimensional data structure, e.g., an R-tree. Method 300 then proceeds to step 340.

In step 340, method queries whether additional vectors are to be generated. In other words, whether addition partitions are needed to cover the space of all possible queries. If the query is negatively answered, then method 300 ends in step 345. If the query is positively answered, then method 300 returns to step 310, where the process is repeated to generate additional partitions to cover the space of all possible queries.

FIG. 4 illustrates the preprocessing method 300 in pseudo code format. Given the domain of possible vectors of constants $[0 \ldots D]^n$, it starts exploring the space by considering the vector corresponding to the upper right corner of the space. This is a vector $\bar{c}$ that dominates all other vectors and consequently according to the observation made above, corresponds to an OPAC query having the maximum profit. This vector is inserted to a queue and the algorithm iterates while the queue is not empty. For each vector $\bar{c}$ in the queue, the algorithm aims to construct an $\epsilon$, $\epsilon'$-accurate answer for it (and subsequently for each vector dominated by $\bar{c}$). The algorithm invokes function LocateSolutions with parameter $\bar{c}$ (line (3) in Algorithm GeneratePartitions). This function returns a hyper rectangle r corresponding to a region of space of $[0 \ldots D]^n$, a solution S, a vector $\bar{C}$ and a profit p. The semantics associated with this result is that S is the solution to a query specifying vector of constants $\bar{C}$ having profit p and forms an $\epsilon$, $\epsilon'$-accurate answer for each vector of constants inside r. The hyper rectangle is inserted in a multidimensional data structure, such as an R-tree, along with the associated profit, vector $\bar{C}$ and solution S. Along with the leaf index entry for r, the profit p and vector $\bar{C}$ are stored as well as a pointer, pointing to the solution (set of tuple identifiers) S on disk. Consequently, the index acts as a secondary structure pointing to $\epsilon$, $\epsilon'$-accurate answers on disk. Finally, (in line 6) function "GeneratePartitions" generates a set of n vectors of constants. This set is constructed in a way such that that no vector in Vec dominates another; namely $\forall \bar{c}', \bar{c}'' \in Vec, \bar{c}' \not\ll \bar{c}''$. This set of vectors is constructed by calling function "CreateFront", which accepts as parameters the coordinates of the newly formed hyper rectangle r and the queue $\vartheta$. Given a hyper-rectangle r with lower left corner $\bar{c}'=(c'_1, \ldots, c'_n)$, and upper right corner $\bar{c}=(c_1, \ldots c_n)$, CreateFront creates a set of n vectors that together dominate the entire space dominated by $\bar{c}$, excluding the space spanned by r. This is the set of vectors $\bar{c}_i=(c_1, \ldots c_{i-1}, c'_i, c_{i+1}, \ldots c_n)$, $1 \leq i \leq n$. Each one of these vectors is inserted in the queue Q, unless it is already in the queue.

Function "LocateSolution" accepts as a parameter a vector $\bar{c}$ and identifies a hyper rectangle $r \subset [0 \ldots D]^n$. Let r correspond to a hyper rectangle defined by vectors $(\bar{c}', \bar{c})$ (where $\bar{c}'$ the lower left and $\bar{c}$ the upper right corners); $\bar{c}$ is the vector provided to LocateSolution at input and $\bar{c}'$ a vector corresponding to a query having a profit no less than an $1+\epsilon'$ fraction of the profit of the query specifying vector of constants $\bar{c}$. Given a specific $\bar{c}$, the search for a $\bar{c}'$ with the aforementioned properties is performed in function LocateSolution. Initially (line (1)) function MultiKnapsack (employing any pseudo polynomial algorithm for solving the multi attribute Knapsack problem) is called to determine a solution S (set of tuples) and the profit p to the query with vector of constants $\bar{c}$. Then, the vector $\bar{c}'$ is formed by decreasing each coordinate of $\bar{c}$ by an $1+\epsilon$ fraction and function MultiKnapsack is called again, this time with vector $\bar{c}'$, to determine the solution S' with profit p', to a query with constant vector $\bar{c}'$. Two cases of may interest arise.

First, if the profit p' of the query with vector $\bar{c}$ is larger than an $1+\epsilon'$ fraction of the profit of the query with vector $\bar{c}$, then algorithm LocateSolutions attempts to minimize vector $\bar{c}'$ by successively reducing its coordinates by a $1+\epsilon$ fraction, updating the solution S' and profit p' attainable (lines (5)-(12)). If it succeeds, the algorithm forms a hyper rectangle using the minimal vector $\bar{c}'$ and $\bar{c}$, returning it along with vector $\bar{c}'$, the profit p' and solution S' (line (14)) of $\bar{c}'$.

Second, if, on the other hand, the profit of the query with vector $\bar{c}'$ is smaller than an 1+ϵ' fraction of the profit of the query with vector $\bar{c}$, then algorithm LocateSolutions does not attempt to reduce vector $\bar{c}'$ further; it forms a hyper rectangle consisting of the ($\bar{c}'$, $\bar{c}$) returning it along with the associated profit p vector $\bar{c}$ and solution S of $\bar{c}$ (line (16)).

Function MultiKnapsack with parameter $\bar{c}$ is guaranteed to return a non empty solution, if a solution that satisfies the constraints exists. The Function will return a null solution if there is no subset of relation R satisfying the constraints imposed by vector $\bar{c}$. To formalize this notion the present invention defines the feasible region of relation R below.

(Feasible Region): Let $R(A_1, \ldots A_n, P)$ be a relation with tuples $(A_1 \ldots A_n)$. Assume that the $\Sigma$ function applied on elements of each attribute $A_i$ and P has range [0 ... D] as well. The feasible region of R is the set of all vectors $\bar{c}$ dominated by vector $(D, \ldots, D)$, that dominate at least one tuple of R.

Algorithm GeneratePartitions progressively reduces the values in each dimension of vectors from the queue and eventually vectors generated by CreateFront will be outside the feasible region. As soon as a vector falls outside the feasible region of R, function MultiKnapsack returns null and progressively the number of elements in the queue decreases. The following example illustrates the operation of the algorithm.

Figure 5:
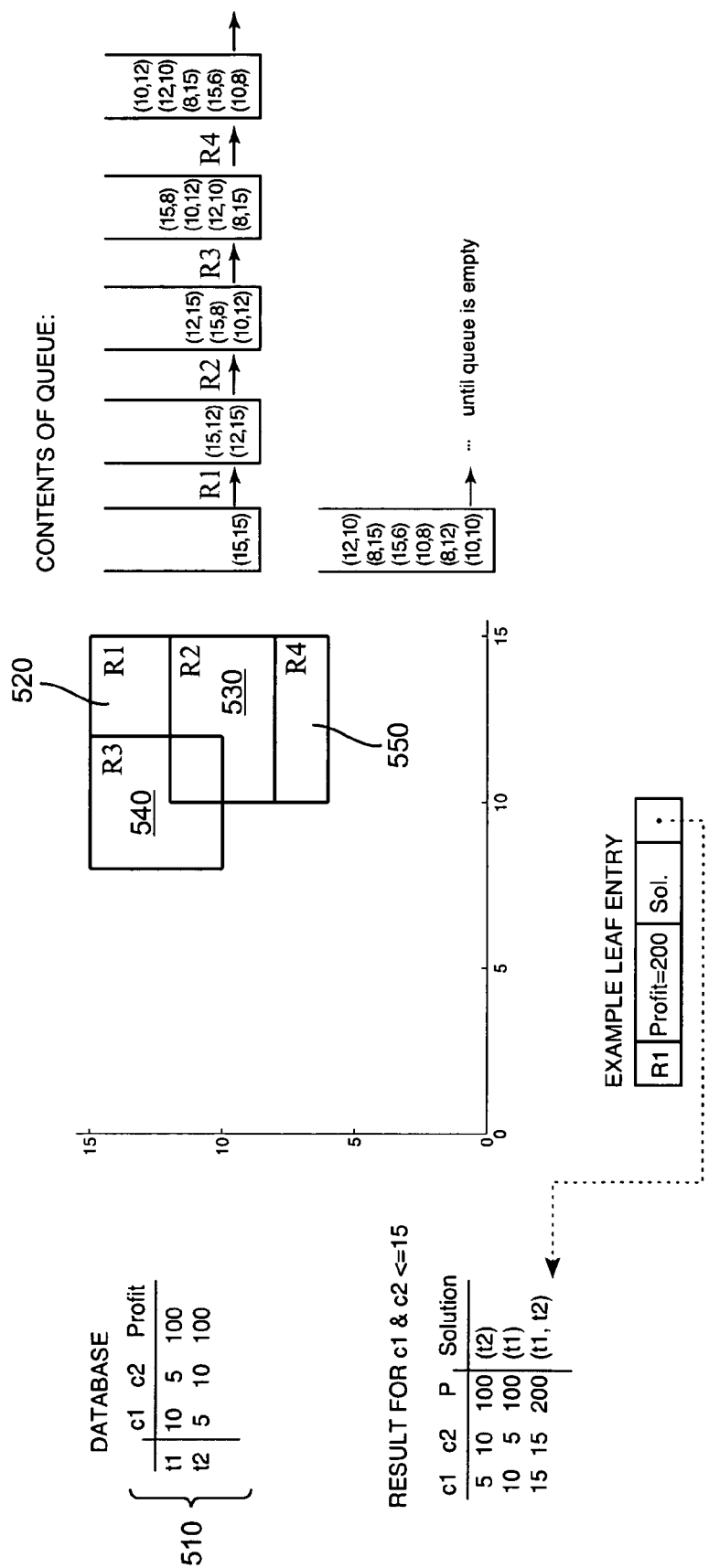
FIG. 5 illustrates the operation of GeneratePartitions of the present invention.

FIG. 5 illustrates an operation of GeneratePartitions of the present invention. Consider the relation in FIG. 5. There are only two tuples, $t_1$ and $t_2$, and the range of the $\Sigma$ function on both attributes is [0, 15]. Assume that ϵ=ϵ'=0.25.

The algorithm starts at (15,15) and finds that the solution at vector (15,15) is $\{t_1, t_2\}$ with Profit 200. The next vector that is investigated by LocateSolution is 1/1.25(15, 15)=(12,12). The best solution at (12,12) is either $\{t_1\}$, or $\{t_2\}$, both with Profit 100. Since 100*1.25<200, the algorithm does not extend this rectangle further. It adds the rectangle 520 $R_1$= [(15,15), (12,12)] in the R-tree, and associates with this rectangle the solution at the top corner, namely $\{t_1, t_2\}$, with Profit 200.

Figure 6:
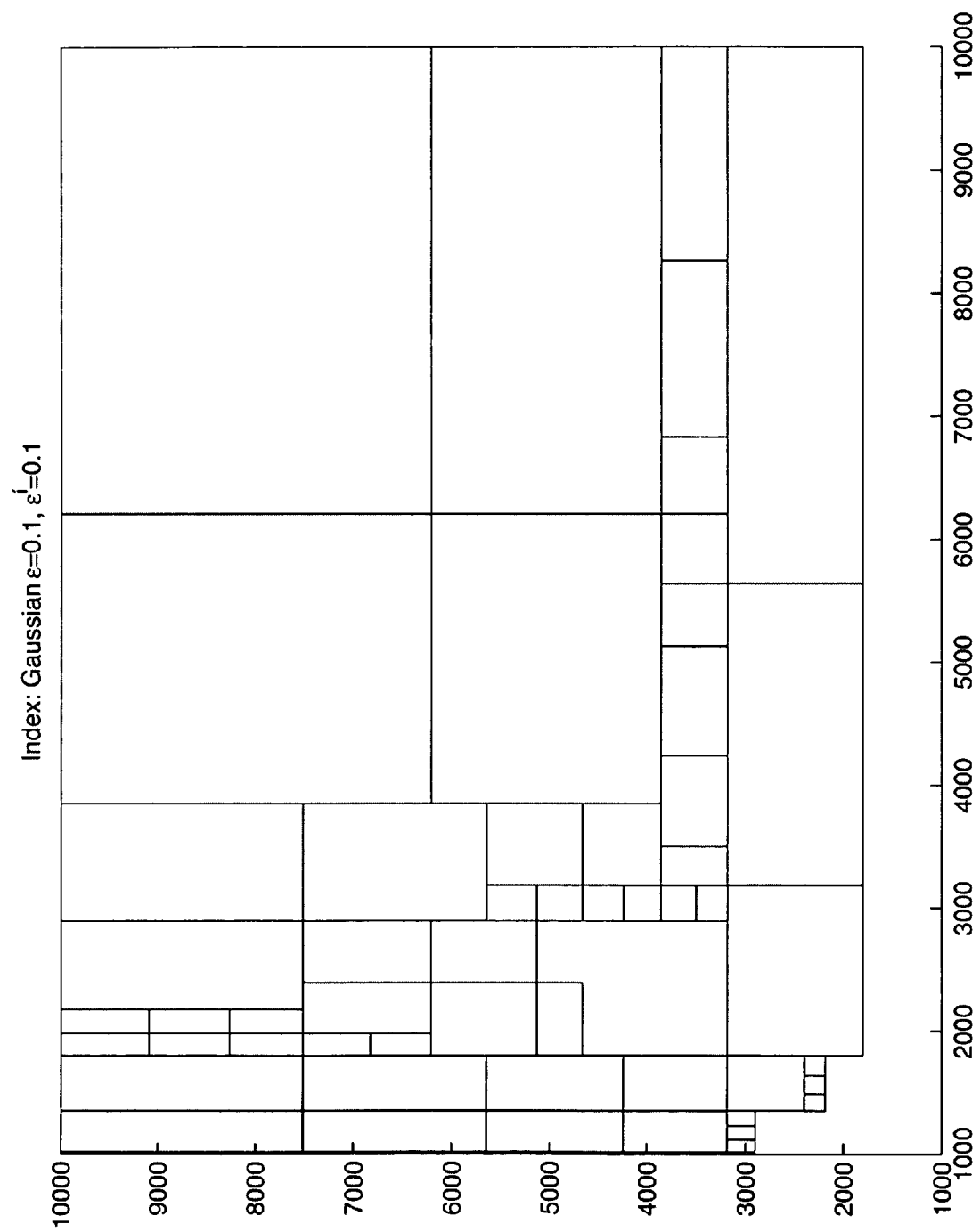
FIG. 6 presents an example of the partitioning generated by algorithm GeneratePartitions of the present invention.

CreateFront then adds the following 2 points in the queue: (15,12) and (12,15). At this point, the top of the queue is (15,12). LocateSolution finds that a solution for this point is either $\{t_1\}$ or $\{t_2\}$, both with Profit 100. The algorithm finds the bottom corner which is 1/1.25 (15,12) =(12,10) (rounding up the numbers to simplify the example) which still has a solution with profit 100, so it extends this to 1/1.25 (12,10) =(10,8) which still has the same solution ($\{t_1\}$), and then to (8, 7), which does not have any feasible solution. So at this point it backs up, and adds the rectangle 530 R2=[(15,12), (10,8)] with solution $\{t_1\}$ and Profit 100 to the R-tree. CreateFront then adds the points (15,8) and (10,12) to the queue. Similarly, considering vector (12,15) leads to the insertion of rectangle 540 R3 in the R-tree, and vector (15, 8) leads to the insertion of rectangle 550 R4. The next vector at the top of the queue is (10,12), which is contained in rectangle R3. So no new rectangle is created, but the vectors (10,10) and (8,12) are inserted in the queue by CreateFront. The operation of the algorithm for this example is illustrated in FIG. 5, where FIG. 6 presents an example of the partitioning generated by algorithm GeneratePartitions.

The outcome of algorithm GeneratePartitions, is a multidimensional index (e.g., an R-tree), providing access to a collection of hyper rectangles. For a query Q specifying a vector of constants $\bar{c}$, the present invention obtains an ϵ, ϵ'-accurate answer.

Specifically, the present invention use $\bar{c}$ and search the multidimensional index seeking hyper rectangles containing $\bar{c}$ and let Ans be the set of hyper rectangles identified. Each of these hyper rectangles obtained from the leaves of the index, has a profit and a vector associated with it and points to a set of tuple identifiers on disk. Any of these solutions is an ϵ, ϵ' answer and returning the vector, profit, and set of tuple identifiers associated with any hyper rectangle in Ans, suffices. In the case Ans is empty, then there is no feasible answer to Q in relation R and thus there is no possible ϵ, ϵ'-accurate answer.

Consider again the example of FIG. 5. Assume one is given query (14,14). This query vector falls in rectangle R1 [(15, 15), (12,12)]. This query can be answered with the solution $\{t_1, t_2\}$, which is associated with R1, and which has Profit 200. This is an ϵ, ϵ'-accurate answer. From the definition of the ϵ, ϵ'-accurate answer; the present invention has to return a solution which satisfies constraints $c'_i$<(1+ϵ) $c_i$ and profit P'(1+ϵ')>P. For the constraint vector (14,14), the best solution is either $\{t_2\}$ or $\{t_1\}$, with profit 100. Since 15≦(1+ϵ) 14=1.25*14, the solution $\{t_1,t_2\}$ satisfies the relaxed constraints, and, since 200*1.25>100, the profit constraint is satisfied as well. Intuitively what happens is that, the present invention does not give an exact answer; but the present invention provides an answer that is at least as good (and may in fact be much better) if the user is willing to relax the constraints by a factor of ϵ.

Let's assume a query (14, 9). This vector falls in rectangle R2. The solution that is returned is the one associated with rectangle r2: $\{t_1\}$, with Profit 100. In this case, $c'_i$<1.25 $c_i$, and P'=P, so this is a ϵ, ϵ'-accurate answer as well.

It should be noted that the present method guarantees that every feasible member of the space of all possible constant vectors will be contained in at least one hyper rectangle. The algorithm will cover the space of candidate query vectors using hyper rectangles.

In particular: Let $\bar{c}$ be the constant vector associated with an OPAC query Q. Assume there exists a subset of tuples that satisfy the constraints $\bar{c}$. Then algorithm GeneratePartitions, creates at least one hyper rectangle containing vector $\bar{c}$.

The fact that the GeneratePartitions method covers the entire feasible space can be demonstrated. The first vector dominates the entire space. Each iteration of the algorithm takes a vector from the queue, uses this vector to form the upper right corner of a new hyper rectangle, and adds a new set of vectors in the queue that together dominate the space that the original vector dominated with the exception of the space of the hyper-rectangle. Since the algorithm terminates when no vectors are in the queue, it follows that the entire feasible space is covered by hyper rectangles.

The following result demonstrates that the answer to any OPAC query, Q, specifying a vector of constants $\bar{c}$, obtained from the index, is an ϵ, ϵ'-accurate answer.

Theorem: Specifically, Let Q be a query specifying vector $\bar{c}$ as a constant vector. Let r be a hyper rectangle containing $\bar{c}$, generated by algorithm GeneratePartitions. The answer to Q returned from the index, consisting of a vector; a set of tuples, and a profit is an ϵ, ϵ'-accurate answer.

The above theorem can be demonstrated. Let $p_2$ be the profit of the lower left corner vector $\bar{c}_2$, and $p_1$ be the profit of the upper right corner vector $\bar{c}_1$ of multidimensional rectangle r. Assume a vector $\bar{c}$ located inside r.

If $p_2(1+\epsilon') \geq p_1$, then the lower left corner is an ϵ, ϵ'-accurate answer: since $\bar{c}_2$ is dominated by $\bar{c}_1$, the optimal profit for $\bar{c}$ is at most $p_1$, and therefore at most an 1+ϵ' fraction higher than $p_2$. In this case algorithm GeneratePartitions stores in the index entry, along with r, a vector with coordinates equal to $\bar{c}_2$ and a profit $p_2$ and thus the answer returned is an $\epsilon, \epsilon'$-accurate answer.

If on the other hand $p_2(1+\epsilon') < p_1$, then the profit of the lower left corner may be more than a fraction of $1+\epsilon'$ smaller than the profit of the query. However, by the construction of the algorithm GeneratePartitions this can only happen if all the values of the vector $\bar{c}$ are within an $1+\epsilon$ fraction of the values of the upper right vector $\bar{c}_1$. In this case, $\bar{c}_1$ provides an $\epsilon$, $\epsilon'$-accurate answer since it gives a much better profit with just an $\epsilon$ relaxation of the constraints. Algorithm GeneratePartitions will associate the vector $\bar{c}_1$ and its profit with the index entry, along with r.

Restricting the present invention to monotone classes of aggregation functions, one can improve the computational aspects related to the construction of an $\epsilon$-Pareto set. The following theorem shows that the total number of hyper-rectangles represented in the index is polynomial.

Theorem: The number of vectors that create new multidimensional rectangles at any step of the execution of algorithm GeneratePartitions, is polynomial to $1/\epsilon$.

The above theorem can be demonstrated. Assume that the range of the $\Sigma$ function applied on the $A_i$ attribute values of a non-empty subset of the tuples is [1 . . . D] for each i. Here it is assumed that the attributes have non zero values; to deal with zero values that have to be added to the interval from zero to the smallest non zero value as one additional interval in the partition.

Then the present invention can partition the range in $$O\left(\frac{\log D}{\log(1+\varepsilon)}\right) = O\left(\frac{\log D}{\varepsilon}\right)$$

intervals (for $0<\epsilon<1$), geometrically increasing with step $1+\epsilon$. Taking the Cartesian product of the n attributes, the present invention creates $$O\left(\left(\frac{\log D}{\varepsilon}\right)^n\right)$$

n dimensional points. Note that, by the construction of the algorithm, every vector inserted in the queue corresponds to one of these points. It follows that the number of hyper rectangles in the index is polynomial to $1/\epsilon$ and to the size of the range of the $\Sigma$ function applied on the attribute values, and is exponential to the number of the attributes.

Figure 7:
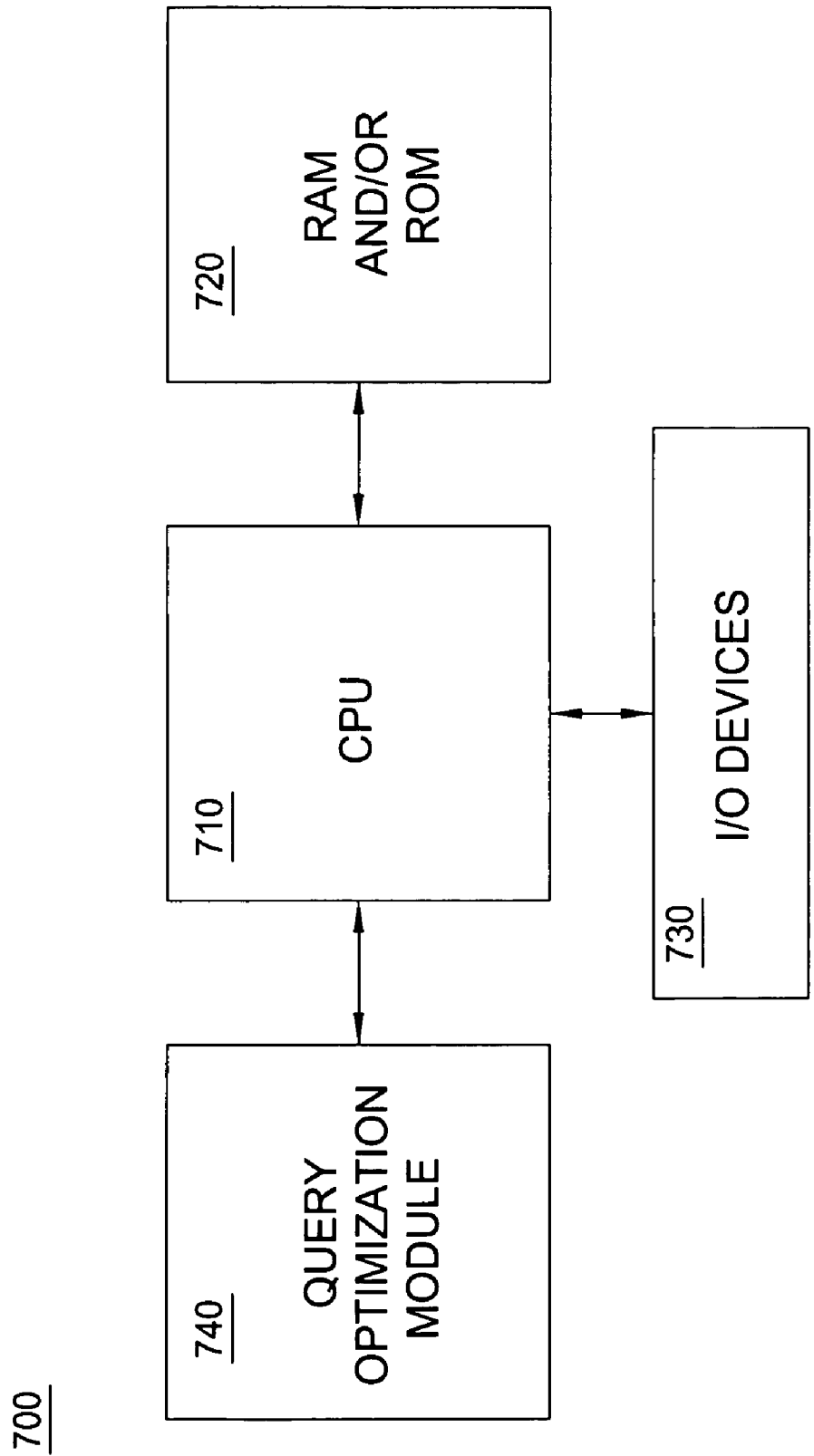
FIG. 7 illustrates a block diagram of the present query optimization method being implemented on a general purpose computer.

FIG. 7 illustrates a block diagram of the present query optimization method being implemented on a general purpose computer 700 or any other hardware equivalents. Specifically, the system can be employed to efficiently provide results in response to a query having aggregation constraints. In one embodiment, the system deploys a query optimization module 740 that executes various methods or algorithms as disclosed above relating to query optimization.

Thus, system 700 comprises a processor (CPU) 710, a memory 720, e.g., random access memory (RAM) and/or read only memory (ROM), the query optimization module 740, and various input/output devices 730, (e.g., storage devices, including but not limited to, a tape drive, a floppy drive, a hard disk drive or a compact disk drive, a receiver, a transmitter, a speaker, a display, a clock, an output port, a user input device (such as a keyboard, a keypad, a mouse, and the like, or a microphone for capturing speech commands).

It should be understood that the query optimization module 740 can be implemented as one or more physical devices that are coupled to the CPU 710 through a communication channel. Alternatively, the query optimization module 740 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 720 of the computer. As such, the query optimization module 740 (including associated data structures) of the present invention can be stored on a computer readable medium, e.g., RAM memory, magnetic or optical drive or diskette and the like.

While the foregoing is directed to embodiments of the present invention, other and further embodiments of the invention may be devised without departing from the basic scope thereof, and the scope thereof is determined by the claims that follow.

The invention claimed is:

1. A method to provide a data management system, comprising:
preprocessing a database having a relation to produce an index, wherein said preprocessing step comprises:
identifying a dominating vector of constants, $\bar{c}'$, for a given n-dimensional vector of constants $\bar{c}$, wherein $\bar{c}'$ is formed by decreasing each coordinate of $\bar{c}$ by a fraction $1+\epsilon$, wherein $\epsilon$ is an approximation factor;
receiving at a computer having a query optimization module a query having aggregation constraints, wherein said aggregation constraints are Optimization under Parametric Aggregation Constraints (OPACs);
applying at said computer having said query optimization module said index to look up a result in response to said query having aggregation constraints; and
providing said result, wherein said result is an approximation.

2. The method of claim 1, wherein said preprocessing step further comprises:
obtaining a partition defined by said vector $\bar{c}$ and said vector $\bar{c}'$.

3. The method of claim 2, wherein said partition is expressed as a hyper rectangle.

4. The method of claim 2, wherein said preprocessing step further comprises:
inserting said partition into a multidimensional data structure.

5. The method of claim 4, wherein said multidimensional data structure is an R-Tree.

* * * * *